Sept. 25, 1951  E. C. MOSS  2,568,817
GAUGING APPARATUS
Filed July 12, 1946

INVENTOR
E.C. MOSS
BY
ATTORNEY

Patented Sept. 25, 1951

2,568,817

UNITED STATES PATENT OFFICE 2,568,817

GAUGING APPARATUS

Earl C. Moss, Westfield, N. J., assignor to Western Electric Company, Incorporated, New York, N. Y., a corporation of New York Application July 12, 1946, Serial No. 683,182

4 Claims. (Cl. 33—174)

This invention relates to gaging apparatus and more particularly to apparatus for gaging location, form, and orientation of curved surfaces.

There are various instances in various arts in which an article has a part, portion or associated member formed with a curved surface whose form and positional relation to other elements of the article may be critically important. One illustrative example of such articles is the case of a two dimensional cam designed to be movable in more than one direction to effect an algebraic summation of two distinct motions in the motion of its follower. Such cams are found, for example, in various calculating devices and in some kinds of control devices. Another case of such an article is the ordinary screw propeller used in driving water borne vessels and air borne flying apparatus. Such screw propellers or "wheels," for short, are ordinarily multilobed, having two, three, or even more blades, and, naturally, must be carefully balanced, both statically and dynamically, to avoid troublesome vibration when run at high speed. Furthermore, since they act on and are reacted on by the fluid in and on which they work, it is necessary that their effective forms as well as their effective masses be accurately balanced against each other if vibration is to be avoided. If one blade, for example, be more effective in its thrust against the fluid than the others, it will tend to produce the same kind of vibrational perturbation as if it were out of dynamic balance with the other blades.

An object of the present invention is to provide a simple, effective, reliable, and durable apparatus for gaging an article of the general character above described.

With the above and other objects in view the invention may be embodied in an apparatus for gaging a parallel projected contour of an article, a base having a plane surface thereon, means to support an article to be gaged in fixed relation to the said surface, a gage guide adjustable on the base to a predetermined position relative to the article, means to releasably lock the gage guide in said position, a gage member movable on the said surface and having a gaging edge perpendicular to the said surface in all positions of the gage member on the surface, and a plurality of means on the gage guide to each steer the gage member to bring the gaging edge thereof into registration with a corresponding predetermined peripheral point of the article.

Other objects and features of the invention will appear from the following detailed description of an embodiment thereof taken in connection with the accompanying drawings in which the same reference numerals are applied to identical parts in the several figures and in which Fig. 1 is a plan view with parts broken away of an apparatus embodying the invention;

Figure 1:
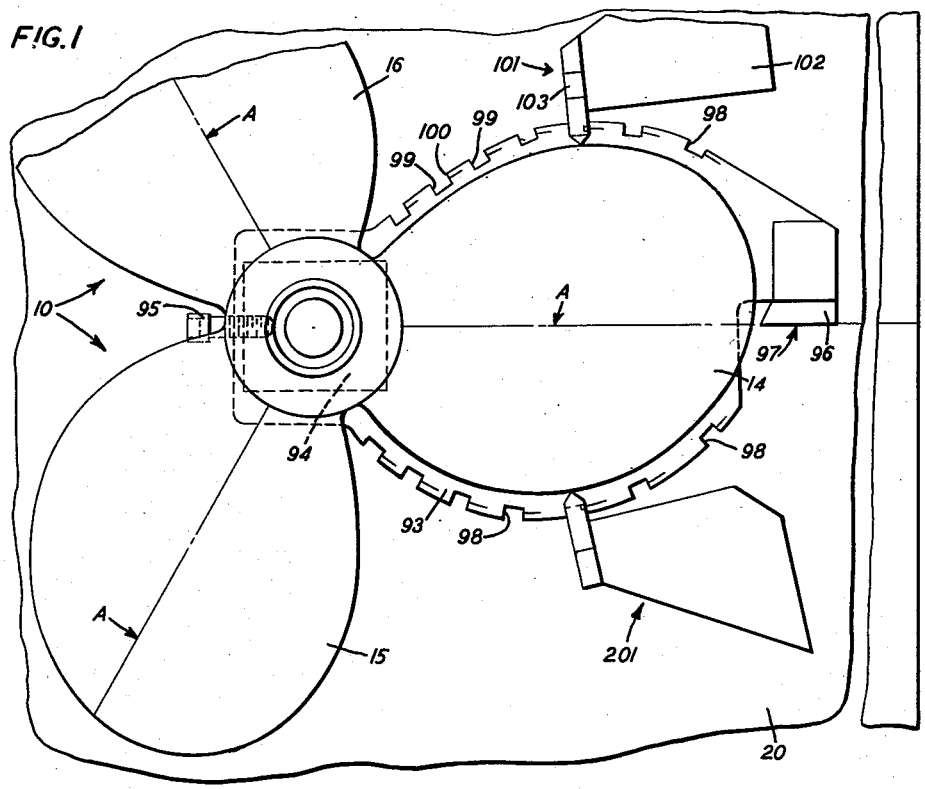
Figure 2:
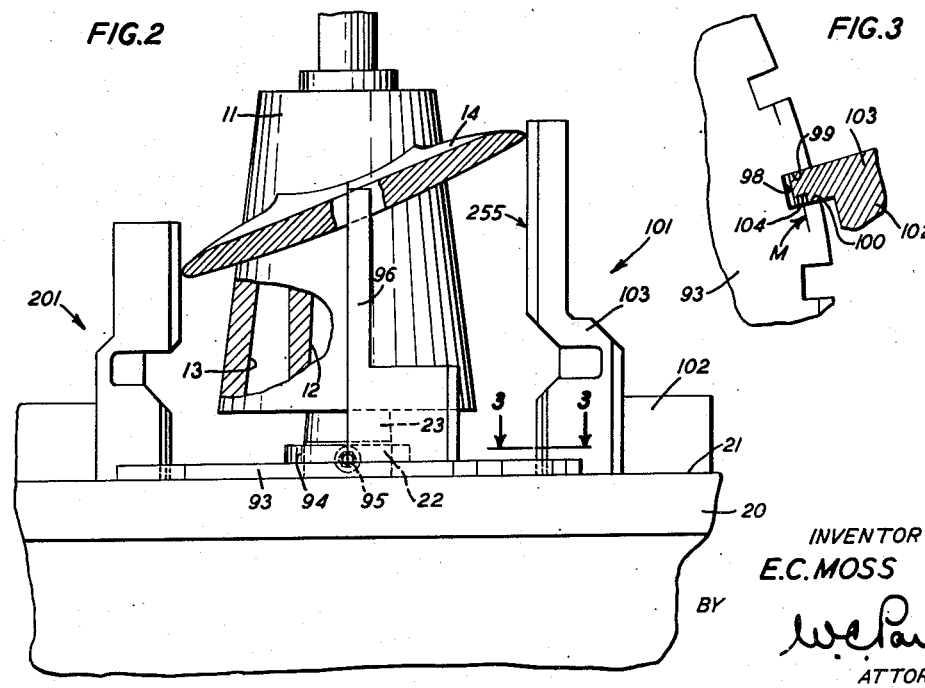
Fig. 2 is a view thereof in front elevation and partly in section.

The illustrative embodiment of the invention herein disclosed is a gaging apparatus whose purpose is to gage the axially projected contour of members radiating from a common axis of an article, the particular article selected for illustration being a three bladed marine propeller wheel, generally indicated at 10, which has a hub 11, formed with a downwardly wideningly tapered axial bore 12, an annular lightening recess 13, and three, identically similar, integral, radially disposed blades 14, 15 and 16. The upper part of the bore 12 is counterbored. The three blades being identically alike in form, any description of any one of them is also a description of either of the other two. The upper surfaces of the blades, as these are oriented in Figs. 1 and 2, are substantially true helicoids having for their common axis the axis of the bore 12, although near the edges of the blades they are chamfered and rounded down. There is in any blade one such line in particular, indicated at A in each of the blades 14, 15 and 16, such that, when the wheel is in operation, the integrated pressures over the areas on the two sides of the A-line are equal and there is no torque about the A-line as axis. It will be assumed, for present purposes, that a wheel to be gaged in the apparatus of the invention, has the A-line of each blade already scribed or otherwise marked thereon.

The apparatus embodying the invention comprises a rigid base 20 having a flat, horizontal upper surface 21, the base 20 being rigidly supported by any suitable means, not shown. A vertical, stationary shaft 22 is rigidly mounted in the base with its axis accurately at right angles to the plane 21. The lower portion 23 of the shaft is tapered to fit snugly the tapered bore 12 of a wheel 10 and thus to support the wheel without any looseness or shake with its A-lines at equal angles to the plane 21. Below the cone 23 the shaft 22 is accurately cylindrical.

A slab-like gage guide 93 is formed with an integral collar 94 to fit snugly down over the cylindrical bottom part of the shaft 22 when the guide 93 lies flat on the plane top face 21 of the base 20; and a jam screw 95 is mounted in the collar 94 to lock the collar and guide releasably in position on the base 20. Over the main portion of each side of its periphery the guide 93 is shaped to be somewhat larger than, but to have generally the same shape as the vertically projected form of the blade 14 (or 15 or 16) of the wheel 10. The outer end of the guide 93 projects well beyond this form and carries a rigid, upstanding, vertical post 96 whose face 97 is formed plane and accurately radial to the axis of the shaft 22, 23. Along each arcuate side of the guide 93, the periphery of the latter is formed with a number of identically similar rectangular notches 98, 98, .... Each such notch 98 is formed so that its parallel sides 99 and 100 are perpendicular to the tangent to the projected contour of the blade 14 at the point midway between the intersection of the sides 99 and 100 with the projected contour, when all the parts involved are ideally correct and arranged as shown in Figs. 1 and 2.

A gaging member generally indicated at 101 has a heavy block-like base 102 with a plane undersurface to rest and slide freely on the horizontal plane surface 21 of the base 20. Integral with or securely attached to the base 102 is a post 103 forming a vertical, slab-like gage proper whose bottom end projects beyond the block 102 and is formed to have an accurate sliding fit in any of the notches 98 of the gage guide 93. The upper part of the gage proper 103 is formed along its outer face with a double bevel providing a gage edge 255, accurately perpendicular to the plane surface 21. The bottom of the post 103 is formed with a rectangular notch 104 in one of the sides adjacent one side, say side 100, of any notch 98 when therein; and the upper face of the gage guide 93 is provided with an index line M perpendicular to the same side of each notch 98.

Figure 3:
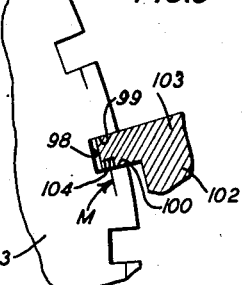
Fig. 3 is a fragmentary enlarged detail in plan and partly in section.

In operation, the gage guide 93 is placed on the surface 21 with its collar 94 in position over the shaft 22; and a wheel 10 to be gaged is fitted down over the cone 23 of the shaft. The guide 93 is then shifted about the shaft 22 until the index surface 97 of the guide is aligned in registry with the A-line of one of the blades, say 14, of the wheel 10; and the jam screw 95 is tightened to lock the guide releasably in this position relative to the blade. The gage member 101 is then shifted on the surface 21 until the protruding bottom of the post 103 enters one of the notches 98 (Fig. 3). The various parts are so proportioned, arranged and related that when the index line M registers midway between the sides of the notch 104, the gage edge 255 will just touch the edge of the blade 14 if the latter is ideally correct in projected contour at this point. If this contour be deficient (excessive) at this point, the gage element 103 will enter more (less) deeply into the notch 98 and the line M will register correspondingly off center with respect to the notch 104. Thus by suitably dimensioning the notch 104 it may be made to act as a maximum and minimum tolerance gage. As suggested at 201, more than one gage member may be provided in cases where the work is large enough for two operators to work together.

The present application is one of a group of five copending applications filed on the same date by the same inventor and closely related, being directed to various modifications of one apparatus for various purposes, the other four applications being Serial Nos. 683,179, now Patent No. 2,564,789, issued August 21, 1951, 683,180, now Patent No. 2,470,636, issued May 17, 1949, 683,181, and 683,183. Each of this group of applications discloses features disclosed in one or more of the others and claimed in one of the others, the drawings being made from an apparatus modifiable by removal, exchange, or addition of parts to embody and subserve the purposes of each of the several inventions of the group. Applicant does not intend the disclosure here of patentable novelty not claimed herein to be a dedication to the public of such novelty, but has presented claims to such features in one or other of copending applications, Serial Nos. 683,179, 683,180, 683,181, and 683,183.

What is claimed is:

1. In an apparatus for gaging projected contours of articles which are angularly disposed about a central body, a base having a plane surface thereon, means to support the article and body in fixed relation to the said surface, a gage guide having a contour generally corresponding to the vertical projection of the article to be gaged, said guide lying flat on the base and being rotatable about the central body to a position in alignment with the vertical projection of the article, means to releasably lock the gage guide in said position, a gage member including a gaging edge movable on said surface and so shaped and positioned with respect to the surface that the gaging edge is perpendicular thereto, and a plurality of means on the gage guide to locate the gage members to bring the gaging edges thereof into registration with a corresponding predetermined peripheral point of the article.

2. In an apparatus for gaging projected contours of articles which are angularly disposed about a central body, a base having a plane surface thereon, means to support the article and body in fixed relation to the said surface, a gage guide having a contour generally corresponding to the vertical projection of the article to be gaged, said guide lying flat on the base and being rotatable about the central body to a position in alignment with the vertical projection of the article, means to releasably lock the gage guide in said position, a gage member including a gaging edge movable on said surface and so shaped and positioned with respect to the surfaces that the gaging edge is perpendicular thereto, said member having a positioning element, and a plurality of positioning elements on the gage guide each complementary to the positioning element on the gage member and conditioned to coact therewith to locate the gage member to bring the gaging edge thereof into registration with a corresponding predetermined peripheral point of the article.

3. In an apparatus for gaging projected contours of articles which are angularly disposed about a central body, a base having a plane surface thereon, means to support the article and body in fixed relation to the said surface, a gage guide having a contour generally corresponding to the vertical projection of the article to be gaged, said guide lying flat on the base and being rotatable about the central body to a position in alignment with the vertical projection of the article, means to releasably lock the gage guide in said position, a gage member including a gaging edge movable on said surface and so shaped and positioned with respect to the surface that the gaging edge is perpendicular thereto, a plurality of means on the gage guide to locate the gage members to bring the gaging edges thereof into registration with a corresponding predetermined peripheral point of the article, and cooperating index means on the gage guide and on the gage member to indicate the positional relation of each to the other when in gaging relationship.

4. In an apparatus for gaging projected contours of articles which are angularly disposed about a central body, a base having a plane surface thereon, means to support the article and body in fixed relation to the said surface, a gage guide having a contour generally corresponding to the vertical projection of the article to be gaged, said guide lying flat on the base and being rotatable about the central body to a position in alignment with the vertical projection of the article, means to releasably lock the gage guide in said position, a gage member including a gaging edge movable on said surface and so shaped and positioned with respect to the surface that the gaging edge is perpendicular thereto, said member having a positioning element, a plurality of positioning elements on the gage guide each complementary to the positioning element on the gage member and conditioned to coact therewith to locate the gage member to bring the gaging edge thereof into registration with a corresponding predetermined peripheral point of the article, and cooperating index means on the gage guide and on the gage member to indicate the positional relation of each to the other when in gaging relationship.

EARL C. MOSS.

REFERENCES CITED

The following references are of record in the file of this patent:

UNITED STATES PATENTS

| Number | Name | Date |
| --- | --- | --- |
| 365,221 | Adler | June 21, 1887 |
| 1,017,009 | McKinless | Feb. 13, 1912 |
| 1,581,566 | Dunbar | Apr. 20, 1926 |
| 2,421,956 | McComb | June 10, 1947 |
| 2,495,891 | Davis | Jan. 31, 1950 |

OTHER REFERENCES

American Machinist, p. 745, November 8, 1928.